Figure 1:
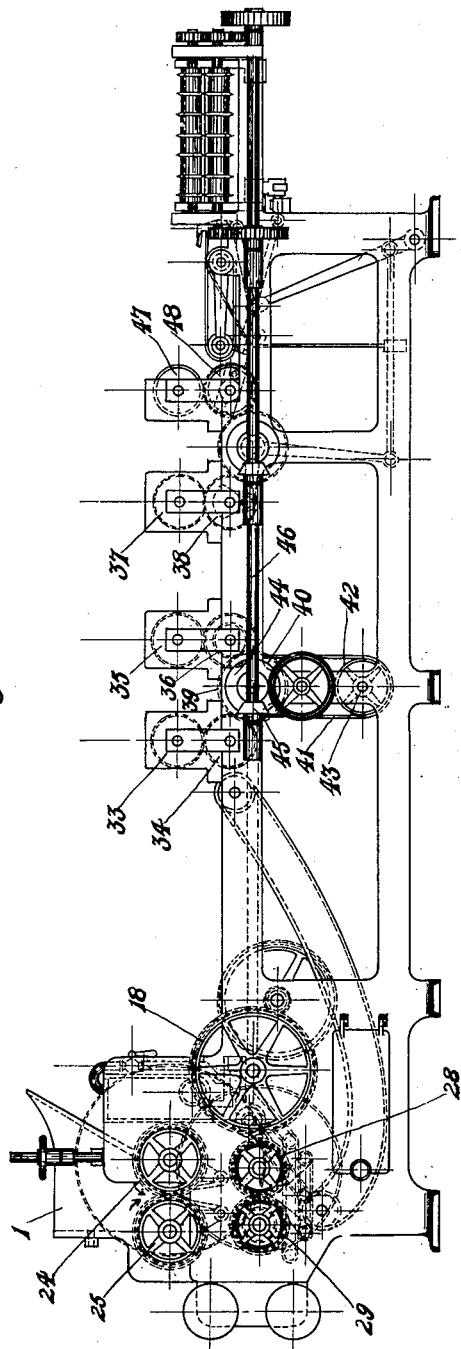

C. BARBIERI.
SHEET MAKING MACHINE.
APPLICATION FILED APR. 16, 1908.

968,109.

Patented Aug. 23, 1910.
3 SHEETS—SHEET 1.

WITNESSES
J. C. Bradley
Archworth Martin

INVENTOR
Cesare Barbieri
by attys
Synnestvedt & Carpenter

C. BARBIERI.
SHEET MAKING MACHINE.
APPLICATION FILED APR. 16, 1908.
968,109.
Patented Aug. 23, 1910.
3 SHEETS—SHEET 2.
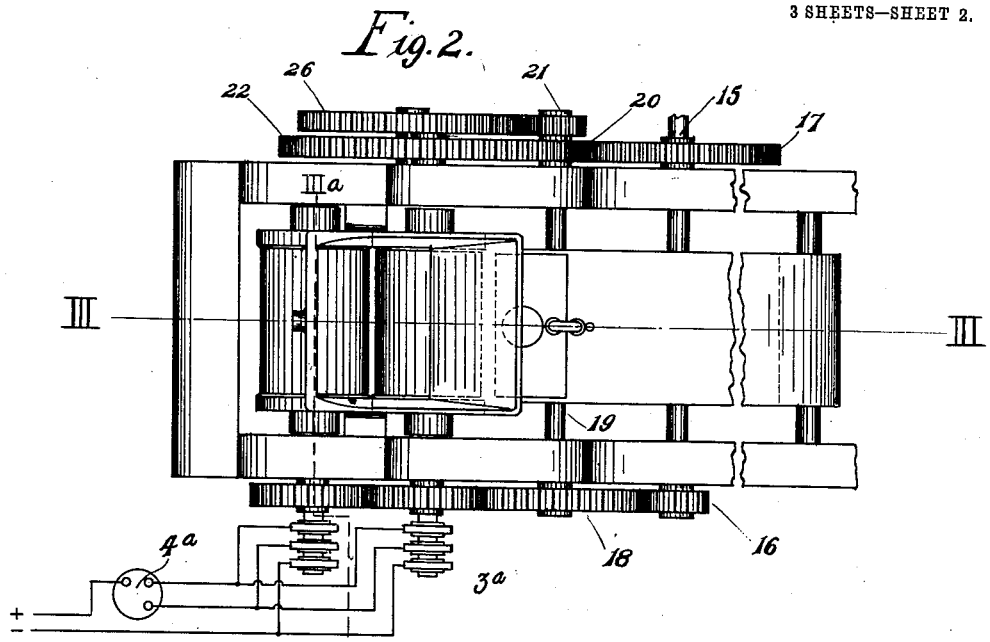
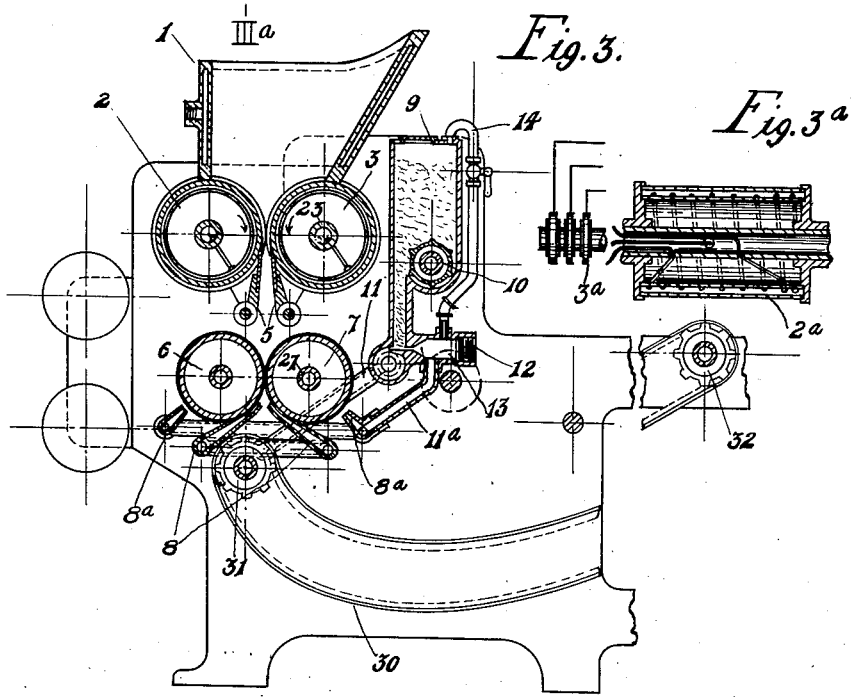
WITNESSES
INVENTOR
Cesare Barbieri
by attys
Synnestvedt & Carpenter

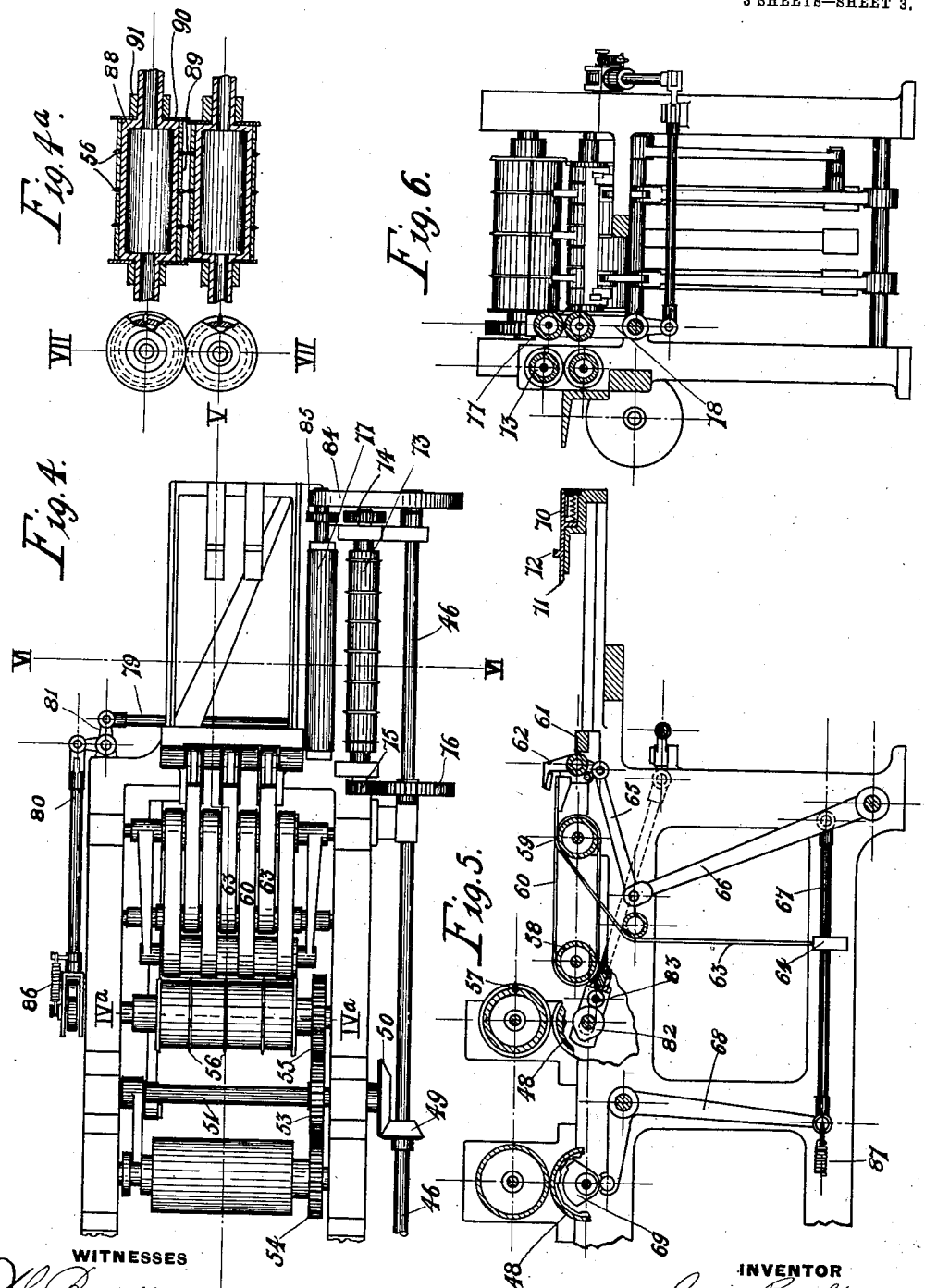

UNITED STATES PATENT OFFICE.

CESARE BARBIERI, OF CHICAGO, ILLINOIS, ASSIGNOR TO BARBIERI,& DELLENBARGER COMPANY, OF CHICAGO, ILLINOIS, A CORPORATION OF ILLINOIS.

SHEET-MAKING MACHINE.

968,109.

Specification of Letters Patent.   Patented Aug. 23, 1910.

Application filed April 16, 1908.   Serial No. 427,402.

*To all whom it may concern:*

Be it known that I, CESARE BARBIERI, a subject of the King of Italy, residing in the city of Chicago, in the State of Illinois, have invented certain new and useful Improvements in Sheet-Making Machines, of which the following is a specification.

This invention relates to machines for forming and handling sheets generally, and more particularly to the forming and handling of sheets from resinous, gummy, sticky material and plastic substances such as gum chicle, gum caoutchouc, caramel, chocolate, taffy, cake and biscuit dough, and other confectionery and bakery goods, and the like, which under working conditions are sticky or both sticky and elastic.

It relates especially to machines for forming, handling and cutting by mechanical means, commercial sizes of sticks of gum chicle, colloquially known as chewing gum.

The principal objects of my invention are to produce sheets and sticks of gum chicle, mechanically, and particularly to produce continuous sheets of uniform thickness, width, consistency and weight, and without necessity of manual contact therewith by any person engaged in such production; to reduce the time required for such production and consequently cheapen the cost of production and enlarge the amount possible for a factory to produce; to produce sheets and sticks of more even and homogeneous texture and more uniform dimension, density and finish, and hence an article more merchantable; to improve by the use of machinery the conditions of hygiene under which such sheets are formed and finished, and thereby to preserve as far as possible the purity of the material and avoid the entrance of foreign matter into the sheets and any danger of contamination or infection thereof ensuant from hand manipulation.

As heretofore made, chewing gum has been manipulated largely by hand. The various processes and the steps incident to manufacture have necessitated that each sheet be subject to the operation of a considerable number of people. Such manufacturing has been conducted necessarily in order to maintain the sheets in plastic condition, under conditions of high temperature, and much to be desired in the way of hygienic conditions it has been impossible to attain, owing to the fact that it has not been found commercially possible to make and cut the sheets of gum by machinery and without manual processing, nor to produce continuous sheets.

To attain the objects above set forth and to overcome the objections stated, I have provided a machine, a preferred form of which is shown in the accompanying drawings, wherein:—

Figure 1 is a side elevation of a machine embodying my inventions, Fig. 2 is a plan view of that part of the machine shown at the left of Fig. 1, Fig. 3, which is an elevation to illustrate the reservoir for the material, the means for heating such reservoir, the take-up rolls, forming knives, and pneumatic powdering apparatus, and cooling apparatus, and conveyer, all to be hereinafter more fully described, Fig. 3$^a$ is a central longitudinal section of one of the forming rolls, taken on the line III$^a$—III$^a$ of Fig. 2 to illustrate a supplemental heating means, Fig. 4 is a plan view of that part of the machine shown at the right of Fig. 1, Fig. 4$^a$ is a central longitudinal section taken on the line IV$^a$—IV$^a$ of Fig. 4, the mode of assembling cutting rolls, Fig. 5, which is an elevation to illustrate the reducing rolls, longitudinal cutter rolls, and severing blade, sheet-stopping and shifting mechanism, all to be hereinafter more fully described, and Fig. 6 is an elevation partly in section taken on the line VI—VI of Fig. 4, to illustrate the shifting and gripping mechanisms for handling the sheets preparatory to giving them the transverse cuts, and the transverse cutter rolls, whereby the small sticks are finally formed.

The machine in its complete and preferred form comprises a series of sets of mechanism through which the material being formed progresses continuously and finally is formed into small sections suitable for wrapping. Briefly stated these sets of mechanisms may be enumerated as follows, (1), the receptacle for receiving the hot or moist plastic mass to be formed into a sheet, (2), mechanisms for preliminarily forming the sheet and, if desired, powdering it preliminary to the subsequent operations, (3), a conveyer for carrying the sheet a certain distance laterally and delivering it to a set of forming mechanisms, (4), forming mechanisms for reducing the sheet in thickness as it progresses therethrough, (5) mechanisms for slitting the sheet longitudinally and transversely to form small sections of the desired proportions.

Referring to Figs. 2 and 3, which show the receiving and preliminary forming mechanism most clearly, 1 is the receiving hopper into which the hot moist or soft plastic material is placed and is preferably made hollow walled in order to provide a jacketing for the mass whereby the temperature and consistency thereof may be regulated by a steam or hot water circulation or other heating apparatus, 2 and 3 are feeding rolls rotated in the directions indicated by the arrows, and are provided with regulable heating means, here shown as a divided resistance coil $2^a$, the unequal sections of which are so arranged with relation to the commutator $3^a$ and switch $4^a$ that the heat of the rolls may be regulated as desired, 5 5 are knife like cutters or removing devices which are held with their edges engaging the surfaces of the rolls 2 and 3, the said cutters 5 being adapted for yielding engagement with the rolls 2 and 3 when the nature of the material acted upon requires a scraping action, 6 and 7 are forming rolls adapted to smooth and compress, and, if desired, to reduce in thickness the sheet as it passes downward from the rolls 2 and 3, the said rolls 6 and 7 being provided with a non-conducting surface such as enamel when externally cooled as here illustrated, whereas they should be formed of a highly conducting material such as steel or copper if internally cooled as may in some instances be desirable, 8 are nozzles for supplying powder to the rolls and to the sheet of material in order to prevent the sheets from sticking to the parts through which it passes. Powder is supplied to the nozzles from the tank 9, which tank is provided with a feeding roller 10, and is connected to the nozzles by means of a tube 11. Air is supplied to the connection 12 for forcing the powder out, which air pressure enters the tank 9 through the passage 13 adjacent the outlet of the tank and through the passage 14 leading to the top of the tank, which arrangement insures a proper feed of the material. Air may also be taken from the connection 12 by the pipe $11^a$ having the nozzles $8^a$ for the purpose of regulating the temperature of the rolls 6 and 7, and to this end may be cooled or heated by any ordinary means, as circumstances may require. The manner in which the rotating rolls and other parts as just described, are driven, is unimportant, but will be seen by referring to Figs. 1 and 2, wherein 15 is the drive shaft carrying the gears 16 and 17. The gear 16 drives the gear 18 carried by the shaft 19, which shaft 19 also carries at its other end the loose gear 20 and the gear 21 which is keyed to the shaft 19. The gear 20 drives the large gear 22 carried by the shaft 23 which also carries the roller 3. This shaft 23 carries at its other end the gear 24 meshing with the gear 25 carried by the shaft of the other roller 2, so that the rollers 2 and 3 rotate in unison. The gear 21 engages the gear 26 carried by the shaft 27 of the roller 7, and the other end of this shaft 27 carries the gear 28 meshing with the gear 29 carried by the shaft of the roller 6 so that the rollers 6 and 7 are geared to rotate in unison.

After the forming of the sheet in the rollers 2, 3, 6 and 7, such sheet descends upon the conveyer belt 30, which conveyer belt is carried over the sprockets 31 and 32 by means of a sprocket chain secured to the inner side of such belt. This conveyer belt is preferably made of considerable length so that the sheet of material in passing thereover has sufficient time to cool, dry or harden somewhat before arriving at the forming mechanism, which cooling or drying is useful in making the sheets of some materials in order that they may be more firm.

Three sets of rolls are provided for thinning the sheets preliminary to cutting, namely, the rolls 33, 34, the rolls 35—36, and the rolls 37—38. The rolls of each pair are provided with spur gears for causing them to rotate in unison, and the gears 34 and 36 are engaged by a spur drive gear 39 carried by a shaft 40 driven by the belt 41, which belt 41 is driven from the pulley 42 carried by the drive shaft 43. The shaft 40 extends transversely across the machine and carries at its end the bevel gear 44, which engages the bevel gear 45 carried by the shaft 46. The means whereby this shaft 46 drives the rolls 37, 38, and the slitting rolls 47, 48, is shown most clearly in Fig. 4 of the drawing, from which it will be seen that the shaft 46 carries a bevel gear 49 meshing with the gear 50 carried by the transverse shaft 51. The shaft 51 carries the gear 53, which drives the gears 54 and 55 carried by the shafts of the rolls 38 and 48, and these gears 54 and 55 engage corresponding gears upon the upper rollers 37 and 47, whereby each pair of rolls is driven in unison. The slitting rolls 47 and 48 are provided with a plurality of opposing cutters 56 adapted to slit the sheets of material into a plurality of long strips, and each of these rolls is in addition provided with a transverse cutting-off knife 57 for severing the continuous sheet into sections substantially equal in length to the circumference of the rolls 47 and 48.

The means for transferring the slitted sheets and cutting them transversely constitutes an important feature of my invention and will be next described, reference being had particularly to Figs. 4, 5, and 6. Referring to these figures, 58 and 59 are a pair of pulleys or rolls carrying a plurality of spaced endless belts 60, 61 is a reciprocatory frame provided with a plurality of oscillatory gripping fingers 62, 63 are a plurality of belts each secured at its upper end to the frame 61, and at its lower end provided with a weight 64, which belts pass over the roller 59 intermediate the endless belts 60, the parts 65, 66, 67 and 68 constitute means for operating the gripping fingers 62 to engage the front edge of a sheet of material and to carry such sheet to the right, and 69 is a cam carried by the shaft of the roller 49 for operating the link mechanism just referred to. In order to properly position the sheet when it is brought forward by the gripping fingers 62, the spring held stop members 70 are provided, each of which members has a portion 71 for passing under the edge of the sheet of material and an upstanding member 72 for engaging and stopping the edge of the sheet of material. In order to slit the sheets laterally, the slitting rolls 73 are provided, which slitting rolls are geared together by means of the gears 74 and are driven from the shaft 46 by means of the gears 75 and 76. The sheet which has been brought up against the stop 70 is fed laterally to the slitting rolls 73 by means of the gripping rollers 77, which rolls are adjacent the edge of the sheet of material and are pivotally mounted on arms 78 as indicated in Fig. 6, whereby they may be moved inward a sufficient distance to grip the edge of the sheet. The arms 78 carrying the ends of the gripping rolls 77 are operated by means of the connecting rods 79 and 80, the crank 81 and the cam 82 secured to the shaft of the roller 48 and engaging the roller 83 on the rod 80. By this means the pair of gripping rollers 77 are intermittently swung forward sufficiently to grip the edge of the sheet of material. The rolls are rotated by means of the belt 84 engaging pulleys on the ends of one of the rolls and the shaft 46, the rolls being geared together by means of the spur gears 85. Springs 86 and 87 are provided to hold the roller 83 against the cam 82 and to hold the end of the member 68 in engagement with the cam 69. No reference has been made as to the adjustability of parts, but it will be understood that all rolls and similar parts requiring adjustment are made adjustable as in the ordinary practice of the art wherein such parts are employed.

In Fig. 4ª, I have shown details of the slitting rolls forming part of my invention. It will be noted that the several cutters 56 are mounted upon a mandrel 88 being spaced apart thereupon by the spacing sleeves 89, the several parts being held in position by the locking members 90 and 91. These annular cutters are thus made removable and so may be readily sharpened. It is to be observed that for use in connection with products that require mere marking (as contradistinguished from cutting) of the sheets, my invention is readily adaptable by slight modification.

Briefly stated the operation of the machine is as follows. The hopper 1 is filled with hot, moist or soft plastic material, and is gradually fed therefrom in a comparatively thick sheet by means of the rotation of the rollers 3, the knife like cutters or scrapers 5 bearing against the surface of the rolls and cutting or removing therefrom the material drawn from the hopper by said rolls and adhering thereto, and causing such material to be carried forward in a continuous sheet like form. The sheet thus formed passes through the rollers 6 and 7. The material may be prevented from sticking to any part of the machine with which it engages by virtue of the addition of the powdered material from the nozzles 8, which in this machine I have shown located adjacent the rolls 6 and 7, but which may be located at any desired point on the machine. Passing on to the belt 30 the sheet is transferred upward and laterally to the thinning or forming rolls, the material, if its consistency so requires, being considerably cooled or dried during its passage along the conveyer and therefore in proper condition to be reduced by the sets of rolls 33, 34, 35, 36 and 37—38. The end of the sheet is then carried between the slitting rollers 47 and 48, which rollers partially sever the sheet into a plurality of long strips, which plurality of strips are finally cut off by means of the knife 57. The front edge of the slitted sheets of material is carried forward on the belts 60 to a position beneath the ends of the gripping fingers 62, and the operation of the connections 65, 66, 67 and 68 by the cam 69 causes the ends of the fingers 62 to first grip the edge of the sheet, and then as the movement of the operating means continues, carries such fingers and the frame 61 to the right (Fig. 5) to a position where the front edge of the sheet engages the upstanding stop 72 at which time the fingers 62 release their grip upon the edge of the material because of the shape of the cam 69 which permits the fingers 62 to rise after the highest portion of the cam passes the upper end of the lever 68. At this moment the gripping and feeding rolls 77 are advanced sufficiently to engage the sheet, such advance being occasioned by the operation of the connecting members 79, 80 and 81 by the cam 82. The feeding rollers 77 carry the sheet through the slitting rollers 73 thus cutting the sheet into small pieces. The frame 61 then returns to its former position and the operation is repeated.

Having thus described my invention and illustrated its use, what I claim as new and desire to secure by Letters Patent is the following:—

1. In a gum machine, a hopper for containing a plastic mass, a pair of spaced rolls for feeding the material from the hopper in a sheet, means for heating the rolls, a second pair of rolls for receiving the sheet, means for cooling the second pair of rolls, a lateral conveyer in position to receive the sheet from the second pair of rolls, and forming rolls in position to receive the sheet from the conveyer.

2. In a gum machine, a hopper for containing a plastic mass, a pair of spaced rolls for taking up the material from the hopper, means for heating the rolls, means for revolving the rolls at substantially the same speed, and a pair of opposing cutters bearing on the rolls for removing the material from the rolls, the said cutters having their edges substantially parallel and substantially tangent to the rolls adjacent their nearest approach.

3. In a machine for forming sheets of gum from a mass of plastic material, a receptacle for the material, means for feeding the material vertically from the lower portion of the receptacle and forming it into a sheet, a conveyer in position to receive the sheet and convey it laterally, additional forming means to which the sheet is carried by the conveyer, and a slitting roller in line with the additional forming means and past which the sheet is fed by the forming means.

4. In a machine for forming sheets of gum from a mass of plastic material, a receptacle for the material, means for feeding the material vertically from the lower portion of the receptacle and forming it into a sheet, a conveyer in position to receive the sheet and convey it laterally, additional forming means to which the sheet is carried by the conveyer, slitting means past which the sheet is fed by the forming means, and automatic means for cutting the sheet transversely to the cuts formed by the slitting means.

5. In a gum machine, means for forming sheet continuously from a mass of material, means for feeding the sheet ahead, a slitting roll provided with a cutting-off means past which the sheet is fed, means for moving the cut off sheet forward, a pair of side slitting rolls and means whereby the cut-off sheet is fed laterally through such rolls.

6. In a gum machine for forming sheets from plastic material, the combination with means for continuously forming the material into a sheet and feeding it ahead, slitting and cutting off means in the line of travel of the sheet for cutting longitudinal slits therein and severing the continuous sheet transversely into sections of limited length, slitting means at the side of the path of travel of the said sections, and means for feeding these sections laterally through such last slitting means.

7. In a machine for forming sheets from plastic material, the combination with means for continuously forming the material into a sheet and feeding it ahead, slitting and cutting off means in the line of travel of the sheet for cutting longitudinal slits therein and severing the continuous sheet transversely into sections of limited length, means for feeding the sections forward, slitting means at the side of the forward position of the sections and means for feeding these sections laterally through such slitting means.

8. The combination in a gum machine, of means for continuously forming a plastic mass into a sheet and feeding it ahead, mechanism for slitting the continuously fed sheet longitudinally and cutting it transversely into lengths, means for intermittently carrying the cut off lengths forward, means for slitting the lengths transversely to the slits already formed located at the side of the forward position of the cut-off lengths, and means for feeding such cut-off sheets laterally past the slitting means.

9. The combination in a gum machine, of means for continuously forming a plastic mass into a sheet and feeding it ahead, mechanism for slitting a continuously fed sheet longitudinally and cutting it transversely into lengths, gripping means for engaging the front edges of the cut-off lengths and pulling them forward, slitting means at the side of the advanced position of the lengths and means for feeding the lengths laterally.

10. The combination in a gum machine, of means for continuously forming a plastic mass into a sheet and feeding it ahead, mechanism for slitting a continuously fed sheet longitudinally and cutting it transversely into lengths, a table for receiving the cut-off lengths and supporting them as they are fed forwardly, comprising a pair of pulleys provided with a plurality of spaced endless belts, a reciprocating frame in front of the front pulley, a plurality of belts each secured at one of their ends to such frame and having their other ends passed over the front pulley and between the first mentioned belts and provided with weights.

11. The combination in a gum machine, of means for continuously forming a plastic mass into a sheet and feeding it ahead, mechanism for slitting a continuously fed sheet longitudinally and cutting it transversely into lengths, of a table for receiving the cut-off lengths and supporting them as they are fed forwardly comprising a pair of pulleys provided with a plurality of spaced endless belts, a reciprocating frame in front of the front pulley, a plurality of belts secured at one of their ends to such frame and having their other ends passed over the front pulley and between the first mentioned belts and provided with weights, and automatic means for intermittently reciprocating the frame.

12. In a machine for forming sheets from plastic material, a forming roll, an air supply, means whereby the forming roll may be subjected to the action of a blast from the air supply, and additional blast means for supplying powder to the rolls.

13. The combination in a gum machine provided with means for feeding a flat sheet longitudinally, of means for marking the sheet longitudinally, means for cutting off lengths of the sheet, means for intermittently carrying the marked lengths forward, means for marking the lengths transversely of the markings already formed, located at the side of the forward position of the marked lengths and means for feeding such marked lengths laterally past the second marking means.

In testimony whereof I have hereunto signed my name in the presence of the two subscribing witnesses.

CESARE BARBIERI.

Witnesses:
G. W. CUNNINGHAM,
ALFRED Y. ANDREWS.